(12) United States Patent
Santi et al.

(10) Patent No.: US 10,469,700 B2
(45) Date of Patent: Nov. 5, 2019

(54) SYSTEMS AND METHODS FOR DIGITAL WATERMARK LOCALIZATION BASED UPON BACKGROUND FOREGROUND ESTIMATION

(71) Applicant: Datalogic IP Tech S.R.L., Calderara di Reno, Bologna (IT)

(72) Inventors: Stefano Santi, Eugene, OR (US); Lorenzo Vorabbi, Rimini (IT)

(73) Assignee: Datalogic IP Tech S.R.L., Calderara Di Reno, Bologna (IT)

( * ) Notice: Subject to any disclaimer, the term of this patent is extended or adjusted under 35 U.S.C. 154(b) by 39 days.

(21) Appl. No.: 15/934,729

(22) Filed: Mar. 23, 2018

(65) Prior Publication Data
US 2019/0297219 A1    Sep. 26, 2019

(51) Int. Cl.
*G06K 9/00* (2006.01)
*H04N 1/32* (2006.01)
*G06K 9/32* (2006.01)

(52) U.S. Cl.
CPC ....... *H04N 1/32251* (2013.01); *G06K 9/3233* (2013.01); *H04N 1/32229* (2013.01); *H04N 1/32267* (2013.01)

(58) Field of Classification Search
None
See application file for complete search history.

(56) References Cited

U.S. PATENT DOCUMENTS 8,665,262 B2    3/2014 Liu

OTHER PUBLICATIONS

Adaptive background mixture models for real-time tracking, Stauffer and Grimson, 1999.
Adaptive Change Detection for Real-Time Surveillance Applications, Huwer and Niemann, 2000.

*Primary Examiner* — Stephen P Coleman
(74) *Attorney, Agent, or Firm* — Dentons US LLP

(57) ABSTRACT

A system and method for localizing an area of interest likely containing a digital watermark is disclosed. Image frames may be segmented into multiple tiles. A pixel having the maximum grayscale or other value and a pixel having the minimum grayscale or other value in each tile may be identified. Maximum and minimum image maps may be generated from the image frame by replacing each tile with the respective maximum and minimum grayscale or other value pixels. A background map may be generated based on a moving average of the grayscale values of the pixels in the image maps. Foreground map(s) may be generated based on the difference of the values from the image maps to the background map. A region of interest may be determined based on the background and foreground maps and provided to a watermark decoder. Content contained in the digital watermark may be read.

20 Claims, 12 Drawing Sheets

SYSTEMS AND METHODS FOR DIGITAL WATERMARK LOCALIZATION BASED UPON BACKGROUND FOREGROUND ESTIMATION

BACKGROUND

Digital watermarking has been increasingly popular in tagging and tracking goods, especially in a retail environment. Digital watermarking (DWM) technology is based upon digitally embedding—i.e. watermarking-tags or any other type of identification information within other images. For example, multiple copies of a barcode or other machine-readable indicia may be digitally watermarked within images, texture, and/or text in a package containing a product. A digital watermark decoder may decode digital watermarks from images, texture, and/or text to retrieve the watermarked barcodes. The barcodes may be read by a barcode reader.

A digital watermark, by definition, is hidden from plain view. Furthermore, a digital watermark does not have a finite pattern as other tags, such as a barcode. Therefore, a watermark decoder has to analyze each part of an image frame to determine whether there is a digital watermark in that part of the image frame. Image processing is computation intensive, and therefore analyzing each and every part of multiple image frames is computationally not efficient. Such brute-force analysis requires a lot of computing power and time. Current decode strategy for DWM decoding is based on static and fixed position for candidate regions, which is not optimal and uses a lot of processing resources for each processed image frame. A time consuming decoding process may not be applicable in a retail environment, where the checkout process has to be fast and efficient.

Therefore, conventional technology for digital watermark decoding may be slow and may not be viable in a retail environment. As such, a significant improvement in the digital watermark decoding technology to make it fast, efficient, and applicable in a retail and industrial environment is desirable.

SUMMARY

To make digital watermark decoding faster and more efficient, identifying areas within an image frame that may more likely contain a digital watermark (DWM) may be performed. To identify regions within an image frame that have a higher likelihood of including a digital watermark, background and foreground estimations to identify foreground areas of higher activity, which may likely contain a digital watermark, may be used. A digital watermark decoder may analyze identified foreground areas for digital watermark decoding and not the entire image, thereby significantly reducing the computational burden, and increasing speed of identifying and reading digital watermarks.

One embodiment of a method of decoding a digital watermark may include segmenting an image frame within a sequence of image frames into multiple distinct tiles including multiple pixels. A background map may be generated based on the tiles. Furthermore, a foreground map may be generated based on the tiles. A region of interest for digital watermark decoding may be determined based on the background and foreground maps. A digital watermark at least partially located in the region of interest may be decoded.

One embodiment of a system for decoding a digital watermark may include a communications unit configured to receive a sequence of image frames and a processing unit in communication with the communications unit. The processing unit may be configured to segment an image frame within a sequence of image frames into multiple distinct tiles each including multiple pixels. The processing unit may be configured to generate a background map and a foreground map based on the tiles. The processing unit may further be configured to determine a region of interest for digital watermark decoding based on the background and foreground maps, and decode a digital watermark at least partially located in the region of interest.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figures 1A, 1B:
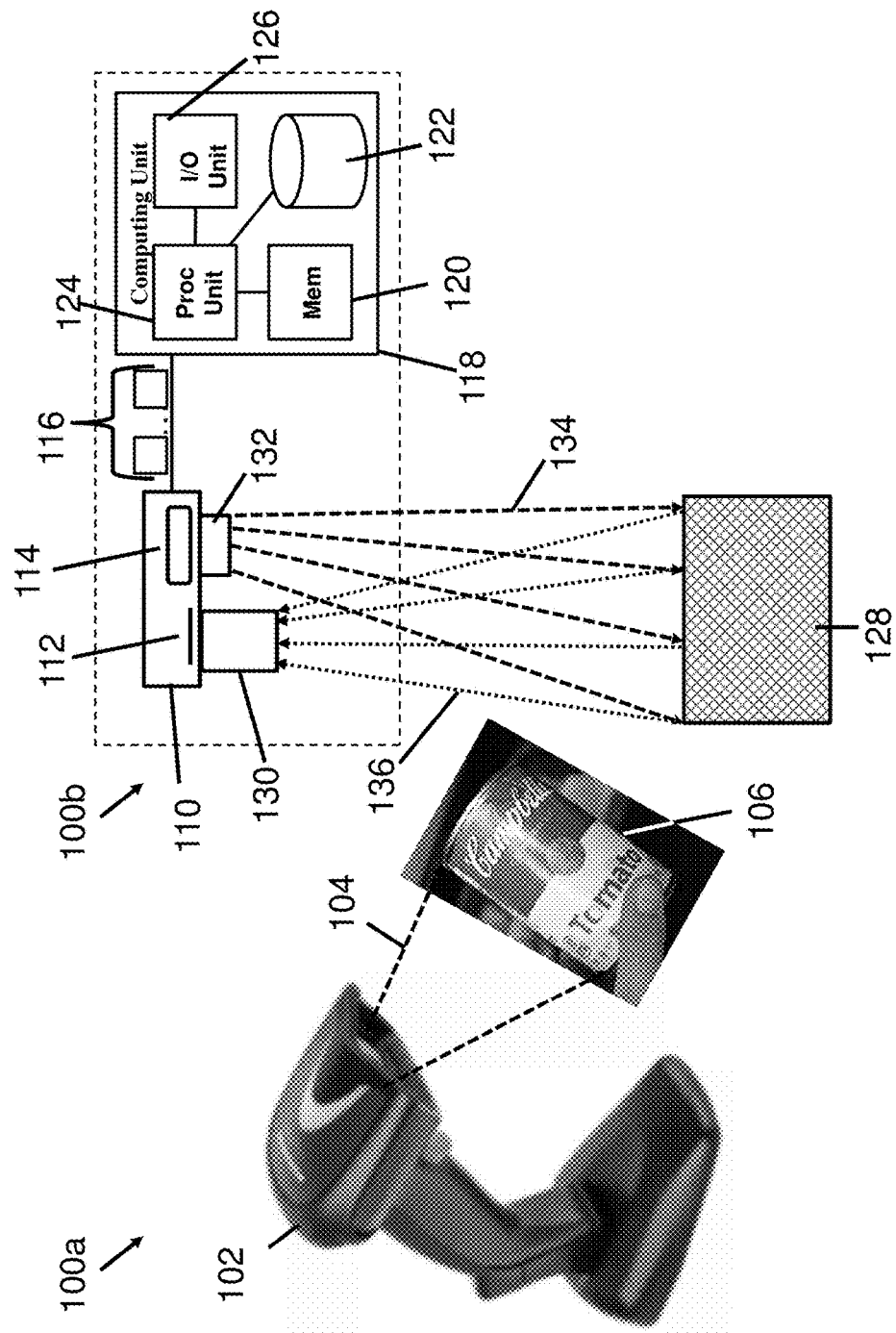
FIG. 1A is an illustration of an illustrative retail checkout environment in which a barcode scanner is used to image a checkout item with a digital watermark embedded on a label of the item.
FIG. 1B is a schematic of an illustrative barcode scanner configured to read DWMs on items.

With regard to FIG. 1A, an illustration of an illustrative scan environment 100*a* is shown. The scan environment 100*a*, which may be retail checkout environment, warehouse environment, distribution environment, or any other environment, may include a scanner 102 and a scan item 106, such as a can of soup with a label affixed thereto. The scanner 102 may be, for example, a barcode scanner, a laser scanner, a linear imager, a presentation scanner, a two dimensional area imager, and/or any other type of scanner. The scanner 102 may be in connection with back-end computing system (not shown), such as a retail computer, point of sale (POS), or any other type of computing system. The connection may be wired with a physical electrical connection between the scanner 102 and the back-end computing system. Alternatively, the connection may be wireless, where the scanner 102 is connected to the back-end computing system through a wireless communications technology, such as Bluetooth®, Wi-Fi, ZigBee®, and/or other type of radio frequency (RF) communications technology. Although the environment 100a shows a handheld scanner 102, this disclosure is not intended to be limited to a handheld scanner, and any other type of stationary or portable scanner should be considered within the scope of this disclosure.

The scan item 106 may be any kind of product to be scanned by the scanner 102. For example, in a retail environment, the scan item 106 may be a consumer product presented by a customer or operator at a checkout counter. In an industrial environment, the scan item 106 may be a package moving along a conveyor belt or otherwise transported. In operation, illustrated as a field-of-view 104 of the scanner 102, any type of electromagnetic wave, such as visible light, laser, infrared to illuminate the surface of the scan item 106 may be projected such that the surface can be scanned and analyzed. In another embodiment, the scanner 102 may scan the surface of the scan item 106 by capturing an image using ambient light and without projecting any type of electromagnetic wave or illumination.

With regard to FIG. 1B, an illustration of an illustrative scan environment 100b is shown. The illustrative scan environment 100b may include a scanner 110, a computing unit 118, and a scan item 128. The scanner 110 may include an illuminator 132 and an imager 130. The imager 130 may include one or more optical components, such as lenses, mirrors, and/or otherwise, as understood in the art. The illuminator 132 may be associated with an illumination source 114. The illumination source 114 may generate any type of electromagnetic radiation, such as visible light, laser, infrared, and any other type illumination used to illuminate the scan item 128. The illuminator 132 may modify/modulate the electromagnetic radiation generated by the illumination source 114 to control the pattern and/or directionality of illuminating the scan item 128. An illustrative illumination 134 is shown to be illuminating the scan item 128. It should be understood that the imager 130 may scan the portion of the scan item 128 illuminated by the illuminator 132. For instance, in a case of visible light illumination, the imager may be a camera that captures images of the portions of the scan item 128 illuminated by the illuminator 132. The imager 130 may be associated with an imaging sensor 112 that may digitize any type of image captured by the imager 130 to generate image data 116. Reflection signals 136 may be illuminated onto the imaging sensor 112 via the imager 130. In an embodiment, the imaging sensor 112 may operate as a global shutter CMOS sensor, and may have a 1280× 1024 resolution (1.3 Mp). It should be understood that alternative imaging sensor configurations may be utilized.

The computing unit 118 may include a processing unit 124, a non-transitory memory 120, an input/output (I/O) unit 126, and a storage unit 122. The processing unit 124 may include one or more processors of any type, where the processor(s) may receive raw image data or partially processed image data 116 from the imaging sensor 112. In some embodiments, the scanner may include a field programmable gate array (FPGA) (not shown), which may downsample image frames captured by the imager 130.

In a first illustrative downsampling, the FPGA or other processing device may divide an image frame into a plurality of non-overlapping tiles, identify the pixel with the maximum grayscale value in each tile, and replace each pixel in each respective tile with the maximum grayscale value. In a second illustrative downsampling, the FPGA or other processing device may divide an image frame into a plurality of non-overlapping tiles, identify the pixel with the minimum grayscale value in each tile, and replace each pixel in each respective tile with the minimum grayscale value. In other words, in both of the illustrative downsampling, the pixels of each tile are replaced by a single pixel, thereby scaling down the image frame by the size of the tile. One having ordinary skill in the art should understand that the aforementioned downsampling may covert an image frame from the image domain to a map domain. One having ordinary skill in the art should further understand that although the downsampling is described as being performed by an FPGA, this process may be partially or fully performed by the processing unit 124 or any other processor.

The non-transitory memory 120 may be any type of random access memory (RAM) from which the processing unit 124 may access raw or processed image data and write one or more processor outputs thereto. The I/O unit 126 may handle communications with devices, such as the scanner 110, the Internet, and/or any other devices using one or more communications protocols, as understood in the art. The storage unit 122 may store software modules implementing one or more image processing and watermark decoding algorithms along with data being captured and processed. Although the computing unit 118 is shown as a single unit in the illustrative environment 100b, one having ordinary skill in the art should understand multiple computing devices, including one or more distributed computers, may be used to accomplish the functionality described herein. Furthermore, one having ordinary skill in the art understands that there may be multiple layers of computer processing, that is, a low intensity computer processing may be conducted locally, and more complex computer processing may be conducted remotely, such as on the cloud.

In operation, and as further described with regard to FIGS. 4A-4F, the processing unit 124 may receive a sequence of image frames in the map domain or perform operations to convert the sequence of image frames from the image domain to the map domain. The map domain may contain downsampled image frames, where each tile may be replaced by a respective pixel with the maximum grayscale value or the minimum grayscale value. From the map domain, the processing unit 124 may update a background map, where the background map may contain a moving average of each of the pixels. In calculating the moving average, the processing unit 124 may not have to keep up with the frame rate of the scanner 110. Rather, the processing unit 124 may recalculate the moving average every second, or every five seconds, and/or any other time interval depending upon the accuracy and efficiency desired. The processing unit 124 may generate a foreground map while keeping up with the frame rate of the scanner 110. That is, the processing unit 124 may compute the differences between the grayscale values of the pixels for every image frame in the map domain (also referred to as map domain image frame) with the background map. If a difference is above a first threshold but below a second threshold, the processing unit 124 may indicate that the respective pixel is in a low activity foreground. If the difference is above the second threshold, the processing unit 124 may indicate that the respective pixel is in a high activity foreground. One having ordinary skill in the art should understand that grayscale values and comparisons described in this embodiment and other embodiments throughout this disclosure is merely for the ease of explanation and in no way is intended to limit the scope of this disclosure. The embodiments of this disclosure are equally applicable other forms of digitized images, such as RGB (red-green-blue) color model and CMYK (cyan-magenta-yellow-black) color model, certain markings or symbols, or otherwise.

The processing unit 124 may segment an image frame in the map domain into multiple overlapping or non-overlapping blocks depending upon the distance between the scanner 110 and the scan object 128. For each block, the processing unit 124 may calculate an activity score based on the grayscale values of the pixels in the respective block. The processing unit 124 may (i) identify one or more boxes with the highest activity scores and (ii) map those boxes to the original image frame in the image domain. The mapped area of the original image frame in the image domain may be designated by the processing unit 124 as an area of interest likely containing a digital watermark. The processing unit 124 may then execute digital watermark decoding libraries in the area of interest to decode digital watermark contained therein. If the processing unit 124 successfully decodes a digital watermark in the region of interest, the processing unit 124 may update the first and the second thresholds for foreground extraction. If however, the processing unit 124 does not find or decode the digital watermark in the region of interest, the processing unit 124 may not update the first and the second thresholds. The blocks may be scanned or shifted horizontally from one side to another within the foreground active area(s) to further search for a DWM. Alternative search patterns by the blocks may be utilized.

Figure 2:
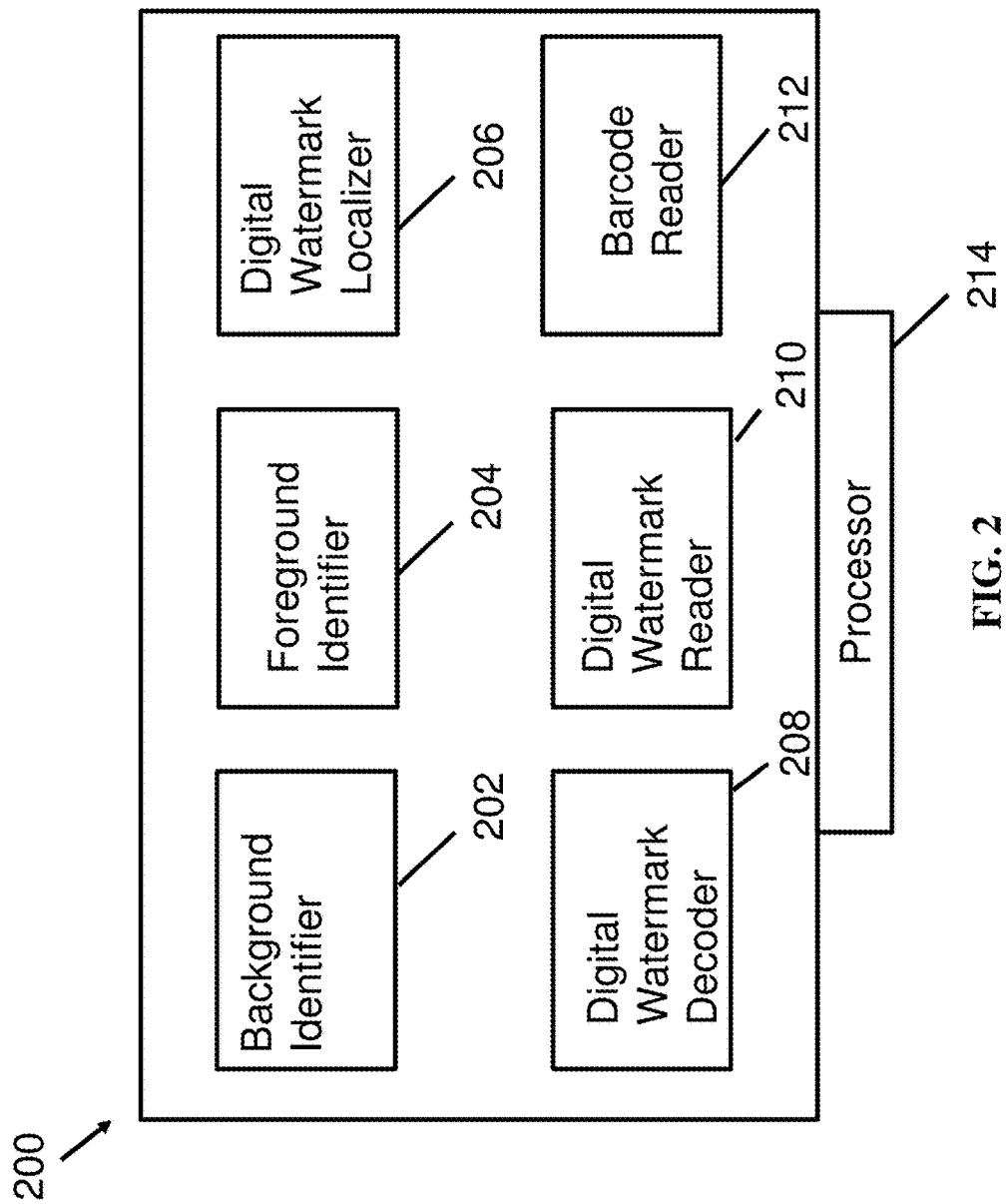
FIG. 2 is an illustration of illustrative software modules configured to localize areas for digital watermarks based on background and foreground analyses according to principles described herein.

With regard to FIG. 2, a block diagram illustrative software modules 200 is shown. The illustrative software modules 200 may include a background identifier module 202, a foreground identifier module 204, a digital watermark localizer module 206, a digital watermark decoder module 208, a digital watermark reader module 210, and a barcode reader module 212. The aforementioned software modules may be executed by a processor 214. It should be understood that additional and/or alternative software modules 200 may be utilized. Moreover, alternative combinations of the software modules 200 may be utilized.

The background identifier module 202 may identify a background in a sequence of image frames in the map domain. In some embodiments, the background identifier module 202 may receive sequence of image frames in the map domain (or, map domain image frames) from a field programmable gate array (FPGA) embedded in a sensor capturing the sequence of image frames. In other embodiments, the background identifier module 202 may receive the sequence of image frames in the map domain from another software module executer by the processor 214. Regardless of the source, the sequence of image frames in the map domain may be a maximum map sequence, where the corresponding sequence of image frames in the image domain may have been segmented into multiple tiles and each tile being replaced by the pixel having the maximum grayscale value therein. In addition or in the alternative, the sequence of image frames in the map domain may be a minimum map sequence, where the corresponding sequence of image frames in the image domain may have been segmented into multiple tiles and each tile being replaced by a pixel having a minimum grayscale value therein. The background identifier module 202 may maintain a moving average of each pixel in the sequence of image frames in the map domain.

Moreover, the background identifier module 202, for each pixel, may maintain a table with a predetermined number (for example, 256) of grayscale values. After each predetermined time interval (for example, 1 second or 5 seconds), the background identifier module 202 may remove the oldest grayscale value from each table, add the newest grayscale value from the newest image frame in the map domain, and recalculate the median value. The repeatedly calculated median value therefore may represent a moving average that is updated after the predetermined time interval by the background identifier module 202. The median values of the pixels may form a background map, which may be used by the foreground identifier module 204 to generate the foreground map.

The foreground identifier module 204 may identify foreground in the sequence of image frames in the map domain. Unlike the background identifier module 202, the foreground identifier module 204 may keep up with the frame rate and execute the foreground identification process for every received map domain image frame. For every pixel in a map domain image frame, the foreground identifier module 204 may calculate the difference in grayscale values of the pixel in the map domain image frame and the corresponding pixel in the background map. If the calculated difference is above a first threshold (second threshold>first threshold) but below a second threshold, the foreground identifier module 204 may indicate that the pixel may be in a low activity foreground. If the calculated difference is above the second threshold, the foreground identifier module 204 may indicate that the pixel is in a high activity foreground. If the pixel is determined to be in a low activity foreground region, a corresponding gray level may be used to visually identify the low activity region. If the pixel is determined to be in a high activity foreground region, a corresponding white level may be used to visually identify the high activity region. Alternative colors, symbols, characters, tints, or otherwise may be utilized to distinguish the low and high activity foreground regions, as well.

The digital watermark localizer module 206 may identify a region of interest likely to contain a digital watermark. More specifically, the digital watermark localizer module 206 may segment a map domain image frame into multiple overlapping or non-overlapping blocks. For each block, the digital watermark localizer module 206 may calculate an activity score based on the grayscale values of the pixels within the block. The digital watermark localizer module 206 may then select one or more blocks with the highest activity scores as a region of interest. The digital watermark localizer module may reproject the region of interest from the map domain to the image domain.

The digital watermark decoder module 208 may operate in the image domain to decode any digital watermark in the region of interest identified by the digital watermark localizer module 206. The digital watermark reader module 210 may read any digital watermark decoded by the digital watermark decoder module 208. The barcode reader module 212 may read any barcode or machine-readable indicia decoded by the digital watermark decoder module 208. In some embodiments, the barcode reader module 213 may read a non-watermarked barcode scanned by a barcode scanner connected to the processor 214. It should be understood that the term "barcode" may refer to any machine-readable indicia, such as a QR code.

One having ordinary skill in the art should understand that the respective functionality of the aforementioned software modules is merely exemplary and similar functionality may be achieved by different set of software modules. Furthermore, the software modules described herein may achieve alternative and additional functionality, which should be considered to be within the scope of this disclosure.

Figure 3:
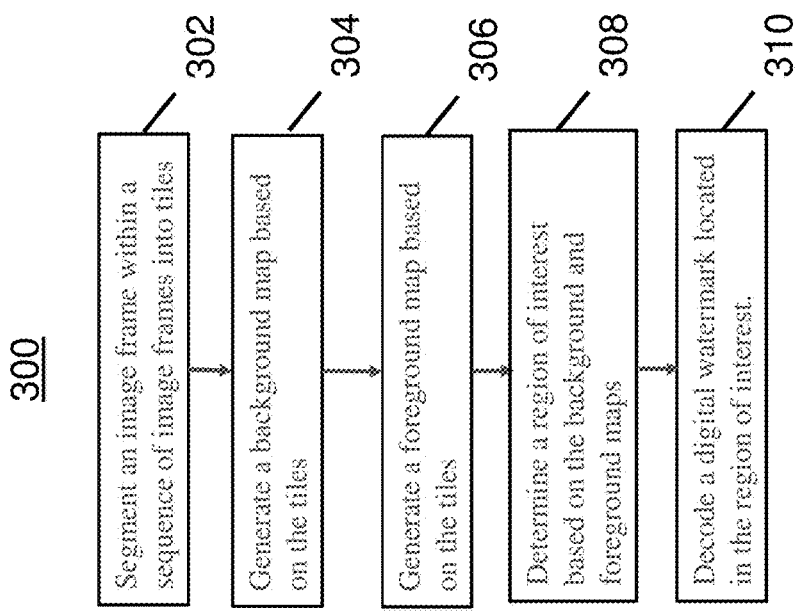
FIG. 3 is an illustration of an illustrative flow diagram of a digital watermark localization process based on background foreground analysis according to principles described herein.

With regard to FIG. 3, a flow diagram of a digital watermark localization process 300 is shown. The process 300 may begin at step 302, where a processor may segment an image frame within a sequence of frames into tiles. In some embodiments, a field programmable gate array (FPGA) or other processing device may segment the image frame prior to further processing, as detailed below, by the processor. For each image frame, the FPGA may generate a minimum map and a maximum map. To generate the maximum map, the FPGA may identify the maximum grayscale value in each tile, and replace the respective tile with a pixel of the maximum grayscale value. To generate the minimum map, the FPGA may identify the minimum grayscale value in each tile, and replace the respective tile with a pixel of the minimum grayscale value. For example, if the image frame is segmented into tiles of 16 pixels by 16 pixels, the size of each of the maximum map and the minimum map may be smaller than the image frame by a scale of 16×16. In some embodiments, the FPGA may select a value less than the minimum and the maximum map to reduce the "salt and pepper" noise, as understood in the art.

In step 304, the processor may generate a background map based on the tiles. In an embodiment, the background map may be based upon the maximum map. In another embodiment, the background map may be based upon the minimum map. In yet another embodiment, the background map may be based upon a combination of the minimum and maximum map. The background map may be based upon a moving average of the grayscale value of each pixel in the maximum map and/or the minimum map. More specifically, the processor may maintain a table of the grayscale value of each pixel in the maximum and/or the minimum map. Each time a new frame is received, the processor may update the table adding the grayscale value of the pixel and remove the oldest value of the pixel. After the table is updated, the processor may determine the median value of the entries in the table such that the median value represents a moving average of the respective pixel. The moving average therefore represents the background pixels. An illustrative pseudocode for generating a background map is shown in TABLE I:

TABLE I

Pseudocode for Generating a Background Map

```
Every N new image
{
    Rearrange all maps
    For each map
    {
        For each pixel of the map
        {
            remove K-oldest value
            insert newest value
            compute median value
            update background map
        }
    }
}
```

In step 304, the processor may generate a foreground map based on the tiles. The processor may keep up with the frame rate to generate the foreground map. In other words, the processor may generate a foreground map based upon every image frame captured by the sensor unlike the background map, where the processor may update the foreground map every predetermined time interval, such as one second or five seconds. To generate the foreground map, the processor may compute the difference between the grayscale values of every pixel in the image map and the respective pixels in the background map and compare the difference against two thresholds. If the processor determines that the difference is below a first threshold, the processor may indicate that the pixel is a part of the background. If the processor determines that the difference is above the first threshold but below the second threshold, the processor may indicate that the pixel is part of a low activity foreground. If the processor determines that the difference is above the second threshold, the processor may indicate that the pixel is a part of a high activity foreground. An illustrative pseudocode for generating a foreground maps is provided in TABLE II:

TABLE II

Pseudocode for Generating Foreground Map

```
For every new image
{
    For each position p
{
    Reset Foreground val fv(p)=0
    For each map
    {
        compare map(p) with background value bv(p)
            If(abs(map(p)−bv(p))>th1(mapType, map(p) ))
                {fv(p)= max(fv(p),v1)}// low activity foreground
            If(abs(map(p)−bv(p))>th2(mapType, map(p) ))
                {fv(p)= max(fv(p),v2)}//high activity foreground
    }
  }
}
```

In step 308, the processor may determine a region of interest based on the foreground and background maps. More specifically, the process may segment a map domain image frame into a plurality of blocks. The blocks may be overlapping in some embodiments and may be non-overlapping in other embodiments. For each of the blocks, the processor may calculate activity values based on the grayscale values of the pixels contained in the respective block. For example, the processor may aggregate the grayscale values of the pixels within the respective block to generate a determined activity value. The processor may select one or more highest activity blocks as a region of interest in the map domain image frame and re-project the region of interest to the image domain original image frame. The blocks may be used to scan or otherwise search the activity regions to identify the DWM or portion thereof. An illustrative pseudocode for determining the region of interest based on the blocks is shown in TABLE II:

TABLE III

Pseudocode for Determining a Region of Interest

```
Set Block Size = B
Empty (Activity, Position) List L
Every map row (or column)
{
    find highest activity (A) block position (P)
    add couple (A,P) to List L
}
Sort List L
Take first H elements of List L
```

In step 310, the processor may decode a digital watermark located in the region of interest by using one or more watermark decoding libraries, as understood in the art.

Figure 4A:
FIG. 4A is an illustration of an illustrative image frame potentially including a digital watermark.

With regard to FIG. 4A, an image frame 400 of in a sequence of image frames is shown. The image frame 400 may include a picture of an object captured by a scanner, as described in the embodiments above. The object may be printed or a sticker label 401 on which a DWM may be included. In an embodiment, a 32 pixel wide metadata side curtain 405 may be computed on-the-fly by the FPGA and included with the tiled image frame 402. The metadata may be encoded with minimum and maximum gray values, amongst other metadata information.

Figure 4B:
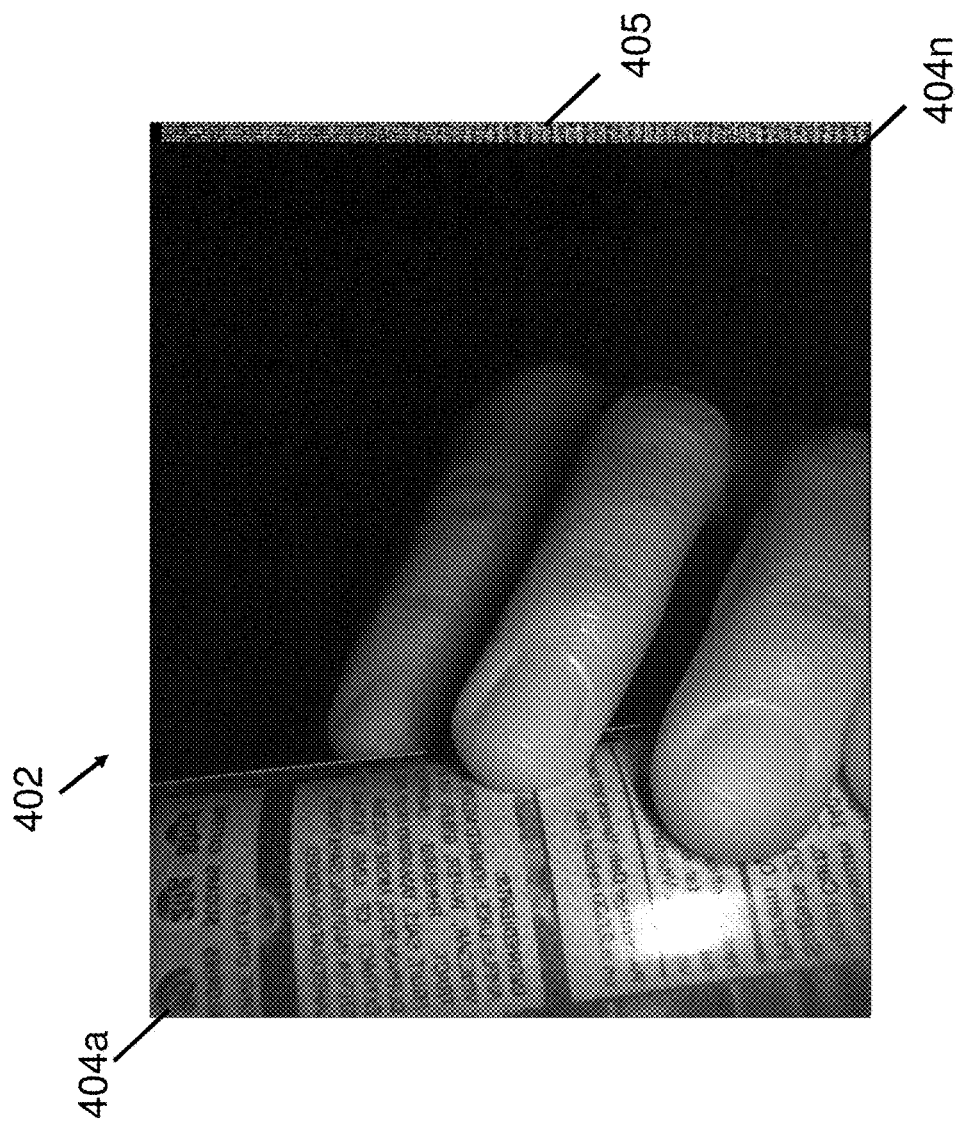
FIG. 4B is an illustration of an illustrative tiled image frame potentially including a digital watermark.

With regard to FIG. 4B, a tiled image frame 402 containing multiple tiles 404a-404n (collectively 404) is shown. In some embodiments, the tiles 404 may be distinct and non-overlapping. For each of the tiles 404, a processor or a field programmable gate array (FPGA) (referred to as "processor" for brevity) may identify a pixel in each of the tiles 404 with the maximum grayscale value and a pixel with minimum grayscale value. In other words, the processor may identify the local maxima and local minima for the grayscale values within each tile. In some embodiments, the processor may not identify the absolute minimum and/or the absolute minimum and implement one or more filters to mitigate sensor noise or any other type of noise. The number of pixels within each of the tiles 404 may be the same or different, and may be set based on resolution of an image sensor or otherwise.

Figure 4C:
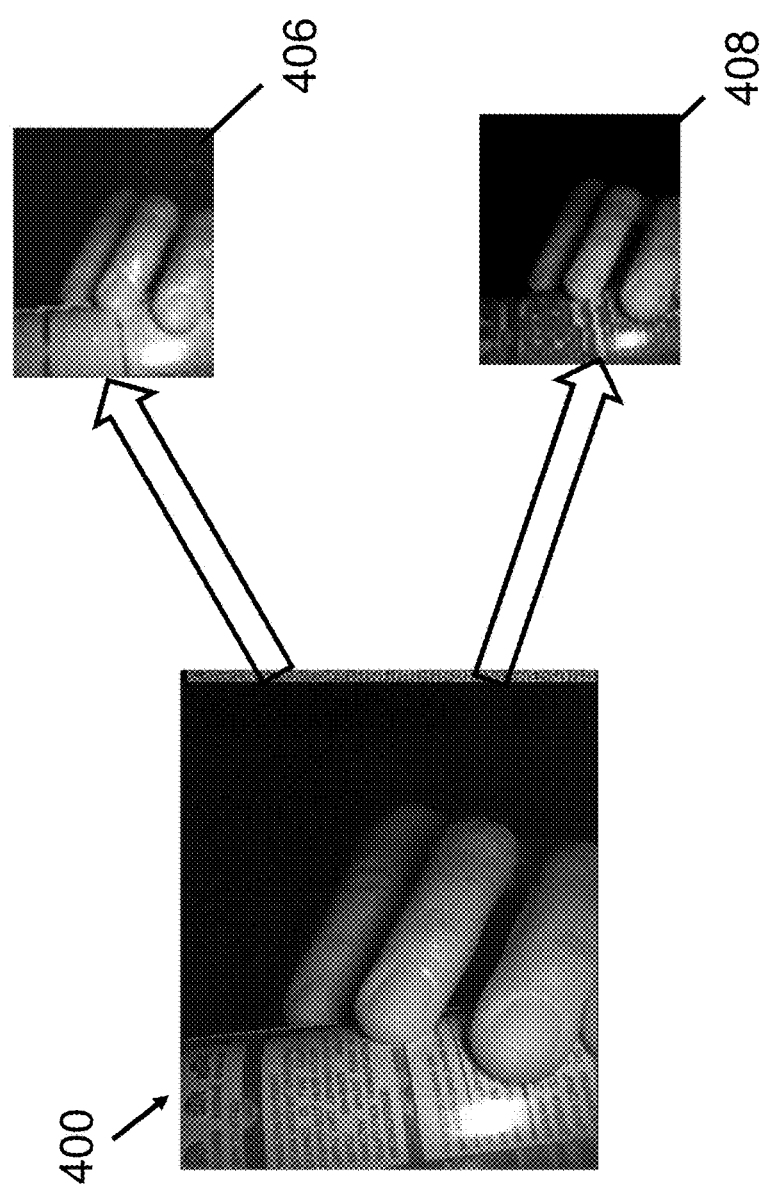
FIG. 4C is an illustration of illustrative maximum and minimum maps generated from the illustrative tiled image frame.

With regard to FIG. 4C, a maximum map 406 and a minimum map 408 generated by the processor from the image frame 400 is shown. The maximum map 406 may contain a pixel for each tile in the tile image frame 402. In other words, each tile in the tile image frame 402 may be defined as a pixel with the maximum grayscale value in the respective tile to generate the maximum map 406. Similarly, each tile in the tile image frame 402 may be replaced by a pixel with the minimum grayscale value in the respective tile to generate the maximum map 408. Therefore, each of the maximum map 406 and the minimum map 408 may be scaled down by the factor of the size of the tile in the tile image frame 402. For example, if the tile image frame 402 is 1024 pixels by 1024 pixels and the tile is 16 pixels by 16 pixels, then the maximum map 406 may be (1024 pixels by 1024 pixels)/(16 pixels by 16 pixels), which is 64 pixels by 64 pixels. This downsampling to generate the maximum map 406 and the minimum map 408 may significantly decrease the computational load in the downstream image processing in the subsequent steps.

Figure 4D:
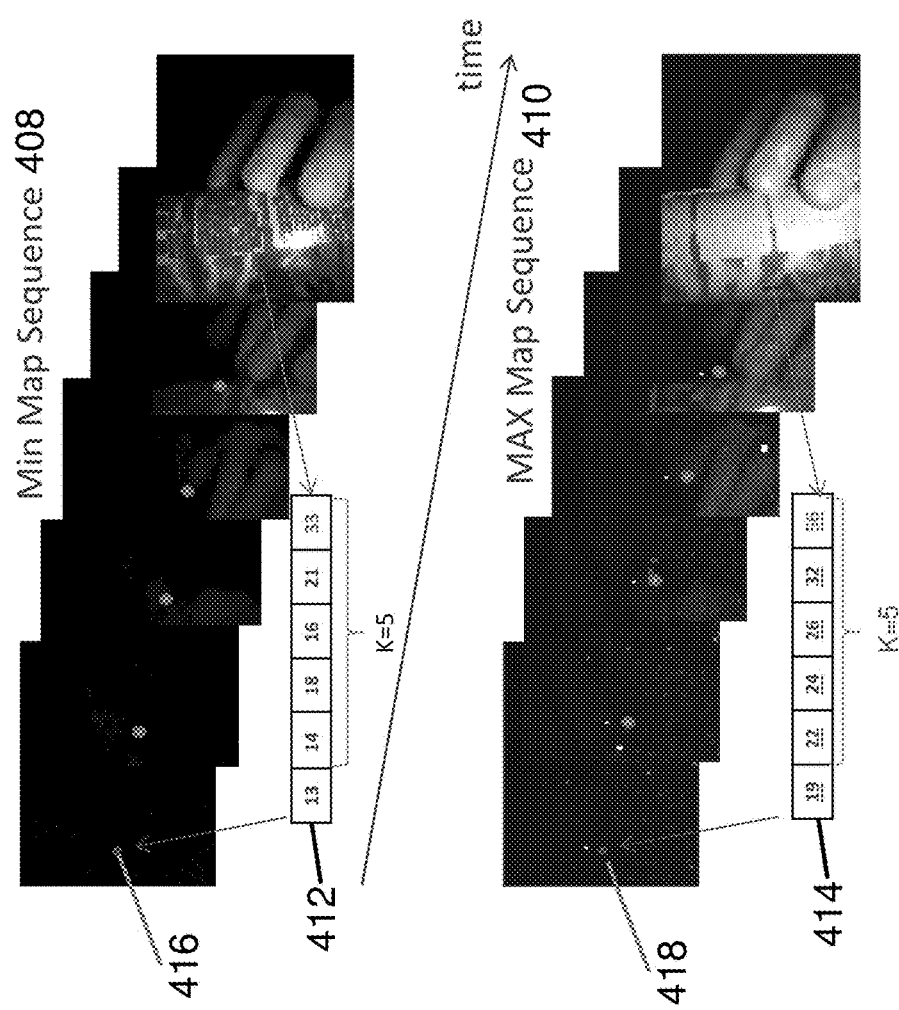
FIG. 4D is an illustration of an illustrative background map extractions based on the minimum and maximum map sequences of FIG. 4C.

With regard to FIG. 4D, an illustrative background map extraction/update process is shown. The background map may be extracted/updated based on a minimum map sequence 408 and/or the maximum map sequence 410. For each pixel the minimum map sequence 408, the processor may maintain a minimum pixel value table 412 and for each pixel in the maximum map sequence 410, the processor may maintain the maximum pixel value table 414. As shown herein, the size of the each of the minimum pixel value table 412 and the maximum pixel value table 414 is five entries. However, one having ordinary skill in the art should understand that the minimum pixel value table and 412 and the minimum pixel value table 414 are merely illustrative, and that the size of five entries is for illustrative purposes only. Typically, each of the minimum pixel value table 412 and the maximum pixel value table 414 may contain around 256 entries. Other lengths of the tables 412 and 414 may be utilized.

The background map extraction process may be based upon the moving average of each pixel in the minimum map sequence 408 (to generate a minimum background map) and the maximum map sequence 410 (to generate a maximum background map). For example, for the pixel associated with the minimum pixel value table 414 in the minimum map sequence 408, the oldest grayscale value (13 as shown herein) from the oldest image frame the minimum map sequence 408 is discarded and the newest grayscale value is added. As shown, the minimum map sequence 408 is darker than the maximum map sequence 410. After the addition of the newest grayscale value, a median of the grayscale value is computed for the minimum pixel value table. Similar operations may be performed for the maximum value table 414. The background map extraction process may not necessarily be performed at the frame rate. Instead, the background map extraction process may be performed at exemplary time intervals, such as every one second to every five seconds. During the startup, the system may take up to two minutes to generate an initial background map. Other amounts of the time may be used based on a number of factors, such as frame rate and processor speed.

Figure 4E:
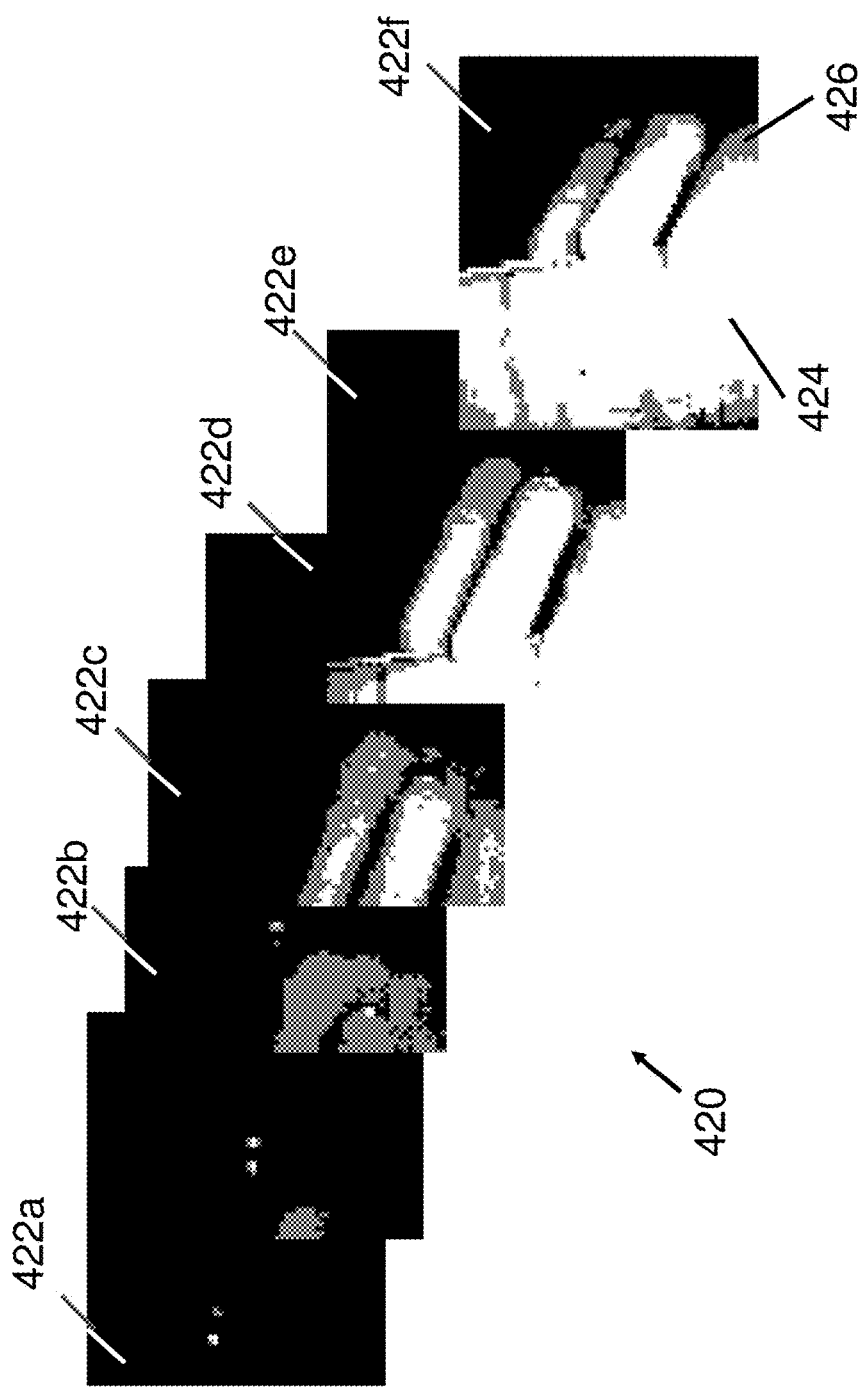
FIG. 4E is an illustration of an illustrative foreground map extraction based on the background map extractions of FIG. 4D.

With regard to FIG. 4E, an illustrative foreground map extraction process is shown. The foreground extraction process may keep up with the frame rate, that is, the processor may extract a foreground map for each image frame captured by the sensor. The foreground map extraction process may be based upon a maximum map sequence and/or a minimum map sequence, but for brevity, this process is described as being based on a map sequence 420, which may be a minimum map sequence and/or a maximum map sequence.

For each pixel in the map sequence 420 including maps 422a, 422b, 422c, 422d, 422e, 422f, the processor may determine the difference between grayscale value of the pixel with the grayscale value of the respective background pixel, shown as black pixels. If the difference is above a first threshold and below second threshold, the processor may indicate that the pixel may be associated with a low activity foreground, shown as gray pixels. If the difference is above the second threshold, the processor may indicate the pixel may be associated with a high activity foreground, shown as white pixels. For example in the image map 422f, a first area 424 may include pixels associated with a high activity foreground and a second area 426 may include pixels associated with a low activity foreground.

Figure 4F:
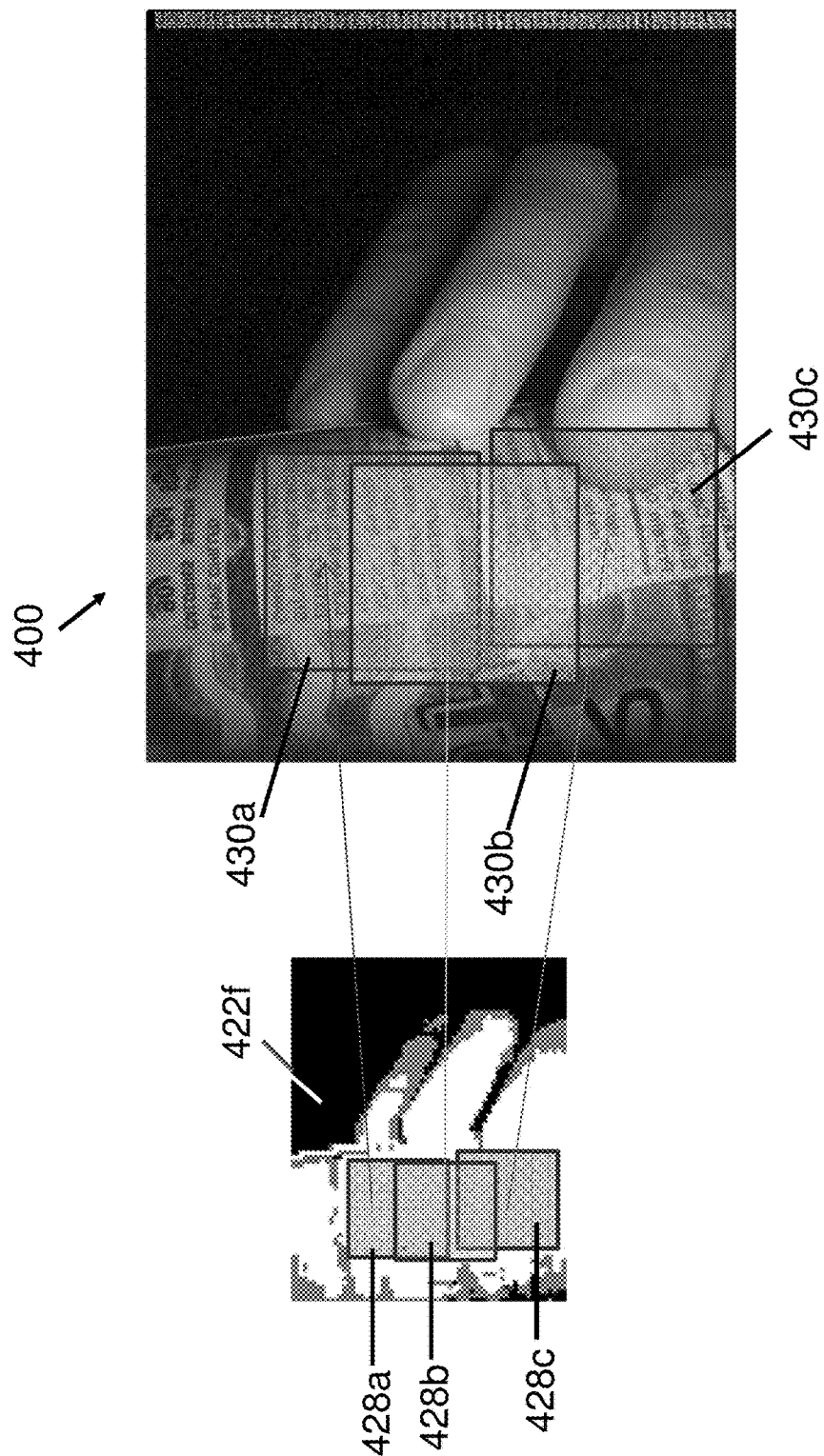
FIG. 4F is an illustration of an illustrative re-projection of high activity blocks to the image frame in the image domain.

With regard to FIG. 4F, an illustrative re-projection of high activity regions 428a, 428b, 428c of the image map 422f to the corresponding regions 430a, 430b, 430c image frame 400 is shown. In other words, the FIG. 4F may illustrate a projection from the map domain to the image domain. The size of respective areas of the high activity regions 428a, 428b, 428c may be based upon various factors, such as the distance of the picture from the imager.

Figure 5:
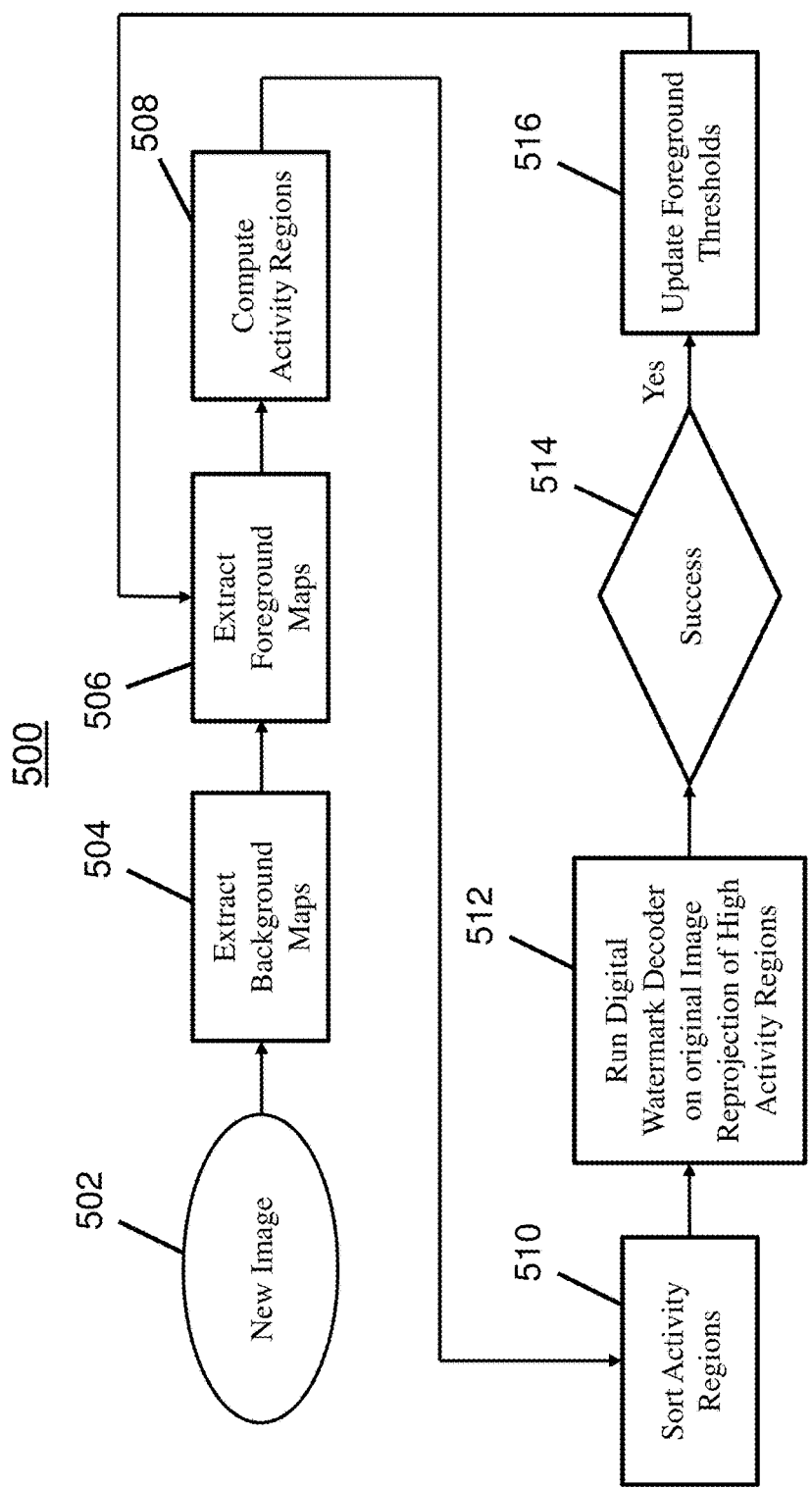
FIG. 5 is an illustration of an illustrative flow diagram for updating foreground thresholds.

With regard to FIG. 5, an illustrative flow diagram of a process 500 for updating a foreground threshold is shown. The process 500 may start at step 502, where an image frame may be received. The image frame may be captured by an image sensor or otherwise, as previously described. In step 504, background maps may be extracted. Extracting the background maps may be performed using the same or similar process as described with regard to FIG. 4D, for example. In step 506, foreground maps may be extracted. Extracting the foreground maps may be performed using the same or similar processes as described with regard to FIG. 4E. At step 508, activity regions may be computed. Computing the activity regions may be performed using the same or similar processes as described with regard to FIG. 4F. The computed activity regions may be sorted. Sorting the activity regions may be made based on size or area of the activity regions (e.g., white pixels as compared to gray pixels).

In step 512, a digital watermark decoder may be run on an original image reprojection of high activity regions. If the digital watermark decoder successfully decodes a digital watermark in the high activity regions in step 514, the foreground thresholds may be updated in step 516. Otherwise, the foreground thresholds are not updated. After updating the foreground threshold maps, the process 500 may repeat starting from step 506. An illustrative pseudocode for updating the foreground threshold maps is shown in TABLE IV:

TABLE IV

Pseudocode for Updating Foreground Threshold Maps

```
If(success)
{
  for each map
  {
    if( Activity of decoded Block > 4*th1(mapType, map(p)) /(B*B))
    {
      increase th1
    }
    if( Activity of decoded Block < 3*th1(mapType, map(p)) /(2*B*B))
    {
      decrease th1
    }
    if( Activity of decoded Block > 2*th2(mapType, map(p)) /(B*B))
    {
      increase th2
    }
    if( Activity of decoded Block < 3*th2(mapType, map(p)) /(2*B*B))
    {
      decrease th2
    }
  }
}
```

Figure 6:
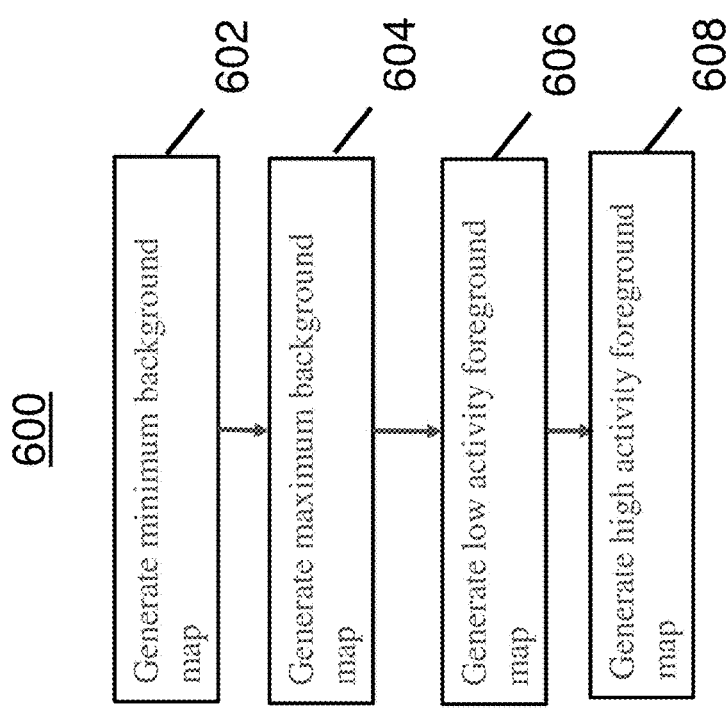
FIG. 6 is an illustrative flow diagram of an illustrative process of generating background and foreground maps.

With regard to FIG. 6, a flow diagram illustrating an illustrative process 600 for generating foreground and background maps is shown. In step 602, a minimum background map is generated based on a minimum map sequence. More specifically, the minimum background map is generated based on the downsampling of the sequence of images by replacing tiles in the images with pixels with lowest grayscale value within the respective tiles. For every pixel, which is now the size of a tile, in the downsampled sequence of images, a median grayscale value is maintained, thereby forming a minimum background map. In step 604, a maximum is generated based on a maximum map sequence. More specifically, the maximum background map is generated based on the downsampling of the sequence of images by replacing tiles in the images with pixels with highest grayscale value within the respective tile. For every pixel (i.e., size of a tile) in the downsampled sequence of images, a median grayscale value is maintained, thereby forming a maximum background map. Each of the background maps may be updated in predetermined time intervals, such as 1 second or 5 seconds. In step 606, a low activity foreground map is generated. The low activity foreground map may include pixels, where the difference between the grayscale values of the pixels and the respective pixels in a background map is above a first threshold but below a second threshold (e.g., gray color pixels). In step 608, a high activity foreground map is generated. The high activity foreground map includes pixels, where the difference between the grayscale values of the pixels and the respective pixels in the background map is above the second threshold (e.g., white color pixels). Each of the foreground maps may be generated at the frame rate.

In some embodiments, a foreground map may be segmented into multiple blocks. An activity score for each of the plurality of blocks may be calculated, and a block with the highest activity score may be selected as a region of interest. The size of the plurality of blocks may be selected based on the distance between a scanner generate an image frame and an object in the image frame. Furthermore, the region of interest may be projected into the original image frame.

Figure 7:
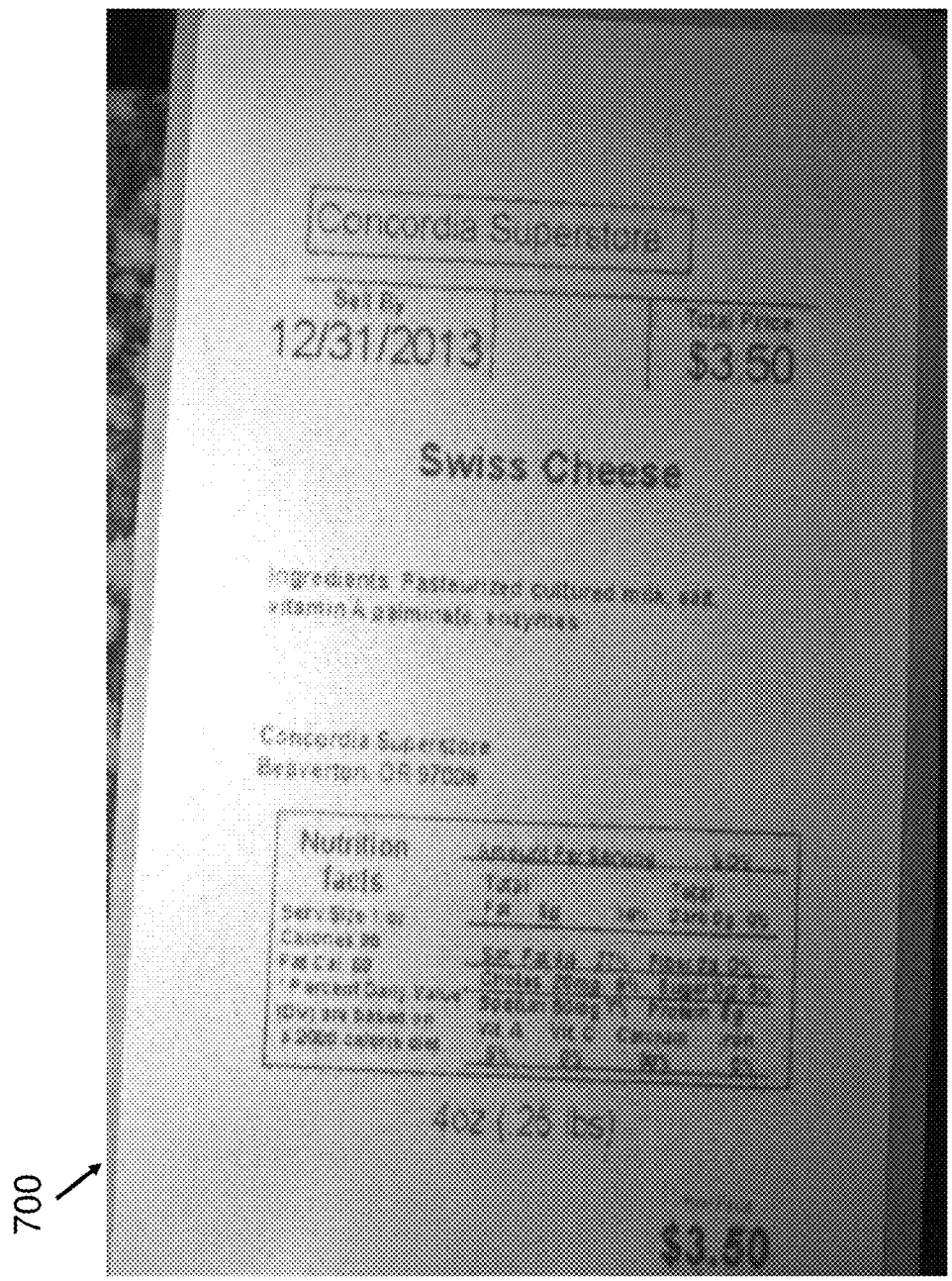
FIG. 7 is an illustration of an illustrative checkout receipt containing an encoded and embedded digital watermark that is machine-readable.

FIG. 7 is an illustration of an illustrative checkout receipt 700 containing an encoded and embedded digital watermark that is machine-readable. Such a digital watermark is generally not perceptible by a human eye, as understood in the art. As described in the embodiments above, the digital watermark may be hidden in the texture of the checkout receipt 700. The embedded digital watermark may be decoded by one or more embodiments described throughout this disclosure. A barcode reader may read machine-readable data represented by the decoded DWM.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A method for decoding a digital watermark, the method comprising:
   segmenting an image frame within a sequence of image frames into a plurality of distinct tiles including a plurality of pixels;
   generating a background map based on the tiles
   generating a foreground map based on the tiles;
   determining a region of interest for digital watermark decoding based on the background and foreground maps; and
   decoding a digital watermark at least partially located in the region of interest.

2. The method according to claim 1, further comprising: reprojecting the region of interest to the image frame.

3. The method according to claim 1, wherein the background map is generated for predetermined time intervals, and wherein the foreground map is generated based on the frame rate of the sequence of image frames.

4. The method according to claim 1, wherein determining the region of interest comprises:
   segmenting the foreground map into a plurality of blocks;
   calculating a activity score for each of the blocks; and
   selecting a block with the highest activity score as the region of interest.

5. The method according to claim 4, further comprising:
   selecting a size for the plurality of blocks based on a distance between a scanner generating the image frame and an object in the image frame.

6. The method according to claim 1, wherein the tiles are in a grayscale format.

7. The method according to claim 6, wherein generating foreground map includes (i) generating a low activity foreground map wherein the respective differences between the grayscale values of the pixels in the low activity foreground map are above a first threshold and below a second threshold and (ii) generating a high activity foreground map, wherein the respective differences between the grayscale values of the pixels in the low activity foreground map are above the second threshold.

8. The method of claim 7, further comprising:
   updating the first and second thresholds based upon receiving an indication of a successful decoding of a watermark in the region of interest.

9. The method according to claim 6, wherein the background map includes a minimum background map based on a pixel with the minimum grayscale value for each of the plurality of tiles and generated by replacing by each tile by the respective pixel with the minimum grayscale value.

10. The method according to claim 9, wherein the background map includes a maximum background map based on a pixel with the maximum grayscale value for each of the plurality of tiles and generated by replacing by each tile by the respective pixel with the maximum grayscale value.

11. The method of claim 10, wherein the background map is generated by updating a previously generated background map by replacing the respective oldest grayscale values for one or more pixels of the previously generated background map, adding the respective grayscale values for the one or more pixels, and calculating the median grayscale values for the one or more pixels such that the background map represents a moving average of the grayscale values of the one or more pixels.

12. A system of decoding a digital watermark, the system comprising:
   a communications unit configured to receive a sequence of image frames;
   a processing unit in communication with the communications unit, and configured to:
      segment an image frame within a sequence of image frames into a plurality of distinct tiles including a plurality of pixels;
      generate a background map based on the tiles;
      generate a foreground map based on the tiles;
      determine a region of interest for digital watermark decoding based on the background and foreground maps; and decode a digital watermark at least partially located in the region of interest.

13. The system according to claim 12, wherein the processing unit is further configured to:
   segment the foreground map into a plurality of blocks;
   calculate a activity score for each of the blocks; and
   select a block with the highest activity score as the region of interest.

14. The system according to claim 12, wherein the processing unit is further configured to:
   generate the background map for predetermined time intervals; and
   generate the foreground map at the frame rate of the sequence of image frames.

15. The system according to claim 12, wherein the tiles are in a grayscale format.

16. The system of claim 15, wherein the processing unit is further configured to generate the background map by updating a previously generated background map by replacing the respective oldest grayscale values for one or more pixels of the previously generated background map, adding the respective grayscale values for the one or more pixels, and calculating the median grayscale values for the one or more pixels such that the background map represents a moving average of the grayscale values of the one or more pixels.

17. The system according to claim 15, wherein the background map includes a minimum background map based on a pixel with the minimum grayscale value for each of the plurality of tiles and generated by replacing by each tile by the respective pixel with the minimum grayscale value.

18. The system according to claim 17, wherein the background map includes a maximum background map based on a pixel with the maximum grayscale value for each of the plurality of tiles and generated by replacing by each tile by the respective pixel with the maximum grayscale value.

19. The system according to claim 15, wherein the processing unit is further configured to:
   generate a low activity foreground map wherein the respective differences between the grayscale values of the pixels in the low activity foreground map are above a first threshold and below a second threshold; and
   generate a high activity foreground map wherein the respective differences between the grayscale values of the pixels in the low activity foreground map are above the second threshold.

20. The system according to claim 19, wherein the processing unit is further configured to:
   update the first and second thresholds based upon receiving an indication of a successful decoding of a watermark in the region of interest.

* * * * *